United States Patent  (10) Patent No.: US 8,898,719 B2
Poder et al.  (45) Date of Patent: Nov. 25, 2014

(54) COMMUNICATION FOR ONE WAY DEVICES

(75) Inventors: James Poder, Cheltenham, PA (US);
Ross Gilson, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 244 days.

(21) Appl. No.: 12/783,926

(22) Filed: May 20, 2010

(65) Prior Publication Data

US 2011/0289536 A1 Nov. 24, 2011

(51) Int. Cl.
| | |
|---|---|
| H04N 7/173 | (2011.01) |
| H04N 21/438 | (2011.01) |
| H04N 21/61 | (2011.01) |
| H04H 60/97 | (2008.01) |
| H04N 21/472 | (2011.01) |
| H04N 21/41 | (2011.01) |
| H04N 21/6543 | (2011.01) |
| H04N 5/44 | (2011.01) |

(52) U.S. Cl.
CPC ....... *H04N 7/17318* (2013.01); *H04N 21/4383* (2013.01); *H04N 21/6118* (2013.01); *H04H 60/97* (2013.01); *H04N 2005/4407* (2013.01); *H04N 21/47202* (2013.01); *H04N 21/6168* (2013.01); *H04N 21/4104* (2013.01); *H04N 21/6543* (2013.01)
USPC ............. 725/121; 725/95; 725/109; 725/119; 725/133

(58) Field of Classification Search
CPC .................. H04N 7/17318; H04N 2005/4407; H04N 21/6168; H04N 21/4104; H04N 21/6543; H04N 21/6118; H04N 21/47202; H04N 21/4383; H04H 60/97
USPC ............................ 725/95, 109, 119, 121, 133
See application file for complete search history.

(56) References Cited

U.S. PATENT DOCUMENTS

| | | | | |
|---|---|---|---|---|
| 4,107,734 | A | * | 8/1978 | Percy et al. ...................... 725/14 |
| 4,107,735 | A | * | 8/1978 | Frohbach ......................... 725/14 |
| 4,308,554 | A | * | 12/1981 | Percy et al. ...................... 725/14 |
| 5,003,384 | A | * | 3/1991 | Durden et al. .................. 725/104 |
| 5,537,397 | A | * | 7/1996 | Abramson ..................... 370/441 |
| 5,594,938 | A | * | 1/1997 | Engel ............................. 725/139 |
| 6,055,314 | A | * | 4/2000 | Spies et al. .................... 380/228 |
| 6,721,956 | B2 | * | 4/2004 | Wasilewski ...................... 725/60 |
| 7,089,577 | B1 | * | 8/2006 | Rakib et al. ...................... 725/87 |
| 7,095,402 | B2 | * | 8/2006 | Kunii et al. .................... 345/169 |

(Continued)

FOREIGN PATENT DOCUMENTS

WO 2004/073310 A1 8/2004

OTHER PUBLICATIONS

European Search Report dated Sep. 15, 2011.

*Primary Examiner* — Nasser Goodarzi
*Assistant Examiner* — Michael B Pierorazio
(74) *Attorney, Agent, or Firm* — Banner & Witcoff, Ltd.

(57) ABSTRACT

A system and method of performing data communication upstream to the network central location is provided. A system and method for providing one way devices with video and/or services distributed using switched digital video can be provided. A system may include a one way device, a gateway device, a user operated communication device, and/or a network central location. Such systems and methods allow for greater functionality, customization and/or interactivity to users of one way devices, which do not communicate data from the one way device upstream to a network central location.

21 Claims, 8 Drawing Sheets

(56) References Cited

U.S. PATENT DOCUMENTS

| | | | |
|---|---|---|---|
| 7,114,167 B2* | 9/2006 | Slemmer et al. | 725/28 |
| 7,310,619 B2* | 12/2007 | Baar et al. | 705/50 |
| 7,325,043 B1* | 1/2008 | Rosenberg et al. | 709/219 |
| 7,412,423 B1* | 8/2008 | Asano | 705/75 |
| 7,412,505 B2* | 8/2008 | Slemmer et al. | 709/223 |
| 7,421,082 B2* | 9/2008 | Kamiya et al. | 380/278 |
| 7,444,306 B2* | 10/2008 | Varble | 705/52 |
| 7,500,235 B2* | 3/2009 | Maynard et al. | 717/172 |
| 7,512,577 B2* | 3/2009 | Slemmer et al. | 706/47 |
| 7,535,888 B1 | 5/2009 | Carlucci et al. | |
| 7,669,220 B2* | 2/2010 | Goode | 725/95 |
| 7,987,489 B2* | 7/2011 | Krzyzanowski et al. | 725/80 |
| 8,046,798 B1* | 10/2011 | Schlack et al. | 725/46 |
| 2002/0007491 A1* | 1/2002 | Schiller et al. | 725/87 |
| 2002/0046406 A1 | 4/2002 | Chelehmal et al. | |
| 2002/0056107 A1* | 5/2002 | Schlack | 725/46 |
| 2002/0062484 A1* | 5/2002 | De Lange et al. | 725/105 |
| 2002/0108121 A1* | 8/2002 | Alao et al. | 725/110 |
| 2002/0178447 A1* | 11/2002 | Plotnick et al. | 725/36 |
| 2003/0126611 A1* | 7/2003 | Chernock et al. | 725/105 |
| 2003/0131349 A1* | 7/2003 | Kuczynski-Brown | 725/6 |
| 2003/0139980 A1 | 7/2003 | Hamilton | |
| 2004/0107443 A1* | 6/2004 | Clancy | 725/100 |
| 2004/0133704 A1* | 7/2004 | Krzyzanowski et al. | 709/250 |
| 2005/0055685 A1* | 3/2005 | Maynard et al. | 717/170 |
| 2005/0216933 A1* | 9/2005 | Black | 725/34 |
| 2005/0216940 A1* | 9/2005 | Black | 725/87 |
| 2006/0041910 A1* | 2/2006 | Hatanaka et al. | 725/58 |
| 2006/0271985 A1* | 11/2006 | Hoffman et al. | 725/111 |
| 2007/0107016 A1* | 5/2007 | Angel et al. | 725/61 |
| 2007/0250900 A1* | 10/2007 | Marcuvitz | 725/141 |
| 2008/0077871 A1* | 3/2008 | Baar et al. | 715/762 |
| 2008/0141325 A1* | 6/2008 | Ludvig et al. | 725/116 |
| 2008/0148336 A1* | 6/2008 | Walter et al. | 725/137 |
| 2008/0201731 A1* | 8/2008 | Howcroft | 725/13 |
| 2008/0307066 A1* | 12/2008 | Amidon et al. | 709/217 |
| 2008/0320392 A1* | 12/2008 | Cleron et al. | 715/709 |
| 2009/0003705 A1* | 1/2009 | Zou et al. | 382/187 |
| 2009/0007199 A1* | 1/2009 | La Joie | 725/95 |
| 2009/0025027 A1* | 1/2009 | Craner | 725/32 |
| 2009/0031341 A1* | 1/2009 | Schlack et al. | 725/38 |
| 2009/0083813 A1* | 3/2009 | Dolce et al. | 725/93 |
| 2009/0083824 A1* | 3/2009 | McCarthy et al. | 725/151 |
| 2009/0089188 A1* | 4/2009 | Ku et al. | 705/30 |
| 2009/0094113 A1* | 4/2009 | Berry et al. | 705/14 |
| 2009/0094646 A1* | 4/2009 | Walter et al. | 725/48 |
| 2009/0100465 A1* | 4/2009 | Kulakowski | 725/39 |
| 2009/0100489 A1* | 4/2009 | Strothmann | 725/114 |
| 2009/0106269 A1* | 4/2009 | Zuckerman et al. | 707/10 |
| 2009/0106386 A1* | 4/2009 | Zuckerman et al. | 709/215 |
| 2009/0106392 A1* | 4/2009 | Zuckerman et al. | 709/217 |
| 2009/0106425 A1* | 4/2009 | Zuckerman et al. | 709/226 |
| 2009/0106441 A1* | 4/2009 | Zuckerman et al. | 709/231 |
| 2009/0106451 A1* | 4/2009 | Zuckerman et al. | 709/239 |
| 2009/0106511 A1* | 4/2009 | Zuckerman et al. | 711/154 |
| 2009/0113009 A1* | 4/2009 | Slemmer et al. | 709/206 |
| 2009/0146779 A1* | 6/2009 | Kumar et al. | 340/5.31 |
| 2009/0160694 A1* | 6/2009 | Di Flora | 341/176 |
| 2009/0178098 A1* | 7/2009 | Westbrook et al. | 725/115 |
| 2009/0183219 A1* | 7/2009 | Maynard et al. | 725/116 |
| 2009/0228620 A1* | 9/2009 | Thomas et al. | 710/65 |
| 2009/0271818 A1* | 10/2009 | Schlack | 725/33 |
| 2009/0298535 A1* | 12/2009 | Klein et al. | 455/556.1 |
| 2010/0033638 A1* | 2/2010 | O'Donnell et al. | 348/734 |
| 2010/0115573 A1* | 5/2010 | Srinivasan et al. | 725/131 |
| 2010/0175080 A1* | 7/2010 | Yuen et al. | 725/32 |
| 2010/0180307 A1* | 7/2010 | Hayes et al. | 725/51 |
| 2010/0325655 A1* | 12/2010 | Perez | 725/30 |
| 2011/0107375 A1* | 5/2011 | Stahl et al. | 725/46 |

* cited by examiner

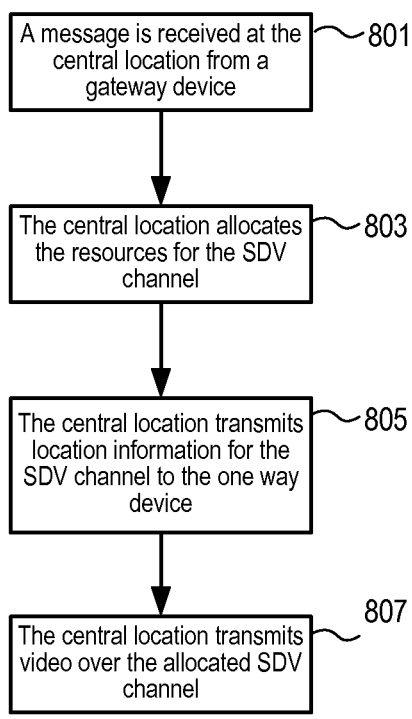
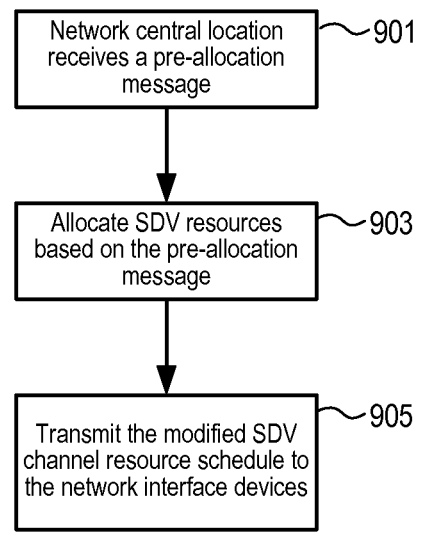
FIG. 8
FIG. 9

US 8,898,719 B2

COMMUNICATION FOR ONE WAY DEVICES

FIELD OF THE INVENTION

The features described herein generally relate to communication between devices on a distribution network. For example, some features relate to distributing signals through a video distribution network, and managing communications over the network.

BACKGROUND

One way devices may be deployed in numerous premises throughout distribution networks that serve numerous households and/or businesses over a wide region. One way devices in a distribution network may receive programming from the network in a downstream direction, demodulate and otherwise process that data, and/or output content for display on a television or other client device. One way devices, however, do not communicate data upstream from the one way device to the distribution network central location.

There remains an ever-present need to offer greater functionality, customization and interactivity to users of one way devices, with minimal inconvenience. Therefore, it would be advantageous to have a system and method that provides data communication upstream to the distribution network central location to allow for greater functionality, customization and/or interactivity to users of one way devices.

SUMMARY

This Summary is provided to introduce a selection of concepts in a simplified form that are further described below in the Detailed Description. This Summary is not intended to identify key features or essential features of the disclosure.

In some embodiments herein, a system including a one way device, a user operated communication device, such as a remote control, and a home gateway device may be used to coordinate communication within a premises, such as a home, and with a network central location. The gateway may include an external interface connected to an external network (e.g., a modem connected to a network, a unified security gateway (USG) device, etc.) and one or more interfaces to communicate with the user operated communication device. In some arrangements, the gateway device and the user operated communication device may coordinate communication between the one way device and devices on the external network, such as a network central location (e.g., a head end).

In some embodiments, a network central location may be configured to allocate resources, receive messages requesting the allocation of resources and/or transmit messages to downstream devices so that one way devices may be provided with video and/or services distributed via switched digital video (SDV). For example, the network central location may receive messages from a user device, such as a gateway or a set top box, having two way communications with the central location that requests the allocation of an SDV channel. The central location may assign resources for the SDV channel (e.g., a broadcast frequency, virtual channel, timeframe, etc.) and may transmit messages to the one way device at regular intervals to notify the downstream devices of the allocated SDV channel schedule. As another example, the distribution network may receive messages from a device at the premises connected to the external network. In some arrangements, the system may include a gateway device connected to the external network, a remote control device and a one way device. Additionally and/or alternatively, the gateway device and the remote control device may coordinate communication between the one way device and the network central location to initiate the allocation of a SDV channel at the central location. Upon receiving the message to initiate the allocation of a SDV channel, the central location may transmit messages to one or more downstream devices, such as one way devices and set top boxes, to notify the downstream devices of the assigned SDV channel.

Still further embodiments combine some or all of the above-described features and/or additional features described herein.

BRIEF DESCRIPTION OF THE DRAWINGS

Some embodiments of the present invention are illustrated by way of example, and not by way of limitation, in the figures of the accompanying drawings and in which like reference numerals refer to similar elements. For convenience, the first portion of each reference numeral corresponds to the drawing figure in which the corresponding drawing element is first introduced.

FIG. 8 is a flow chart of an illustrative method for allocating resources for video distributed via switched digital video.

FIG. 9 is a flow chart of an illustrative method for pre-allocating resources for a SDV channel based on communication between a two way device and a network central location.

DETAILED DESCRIPTION

Some embodiments are described in the context of a network providing television content, high speed data communication, telephony and other services to devices over a provider network. The network may be, for example, a fiber optic, coaxial cable, wireless, or any other type of suitable network. In some examples, the network elements may be described with respect to a hybrid fiber-coaxial (HFC) cable plant using one or more protocols. The disclosure is not limited to networks using a specific type of communication medium or to a specific set of communication protocols.

Figure 1:
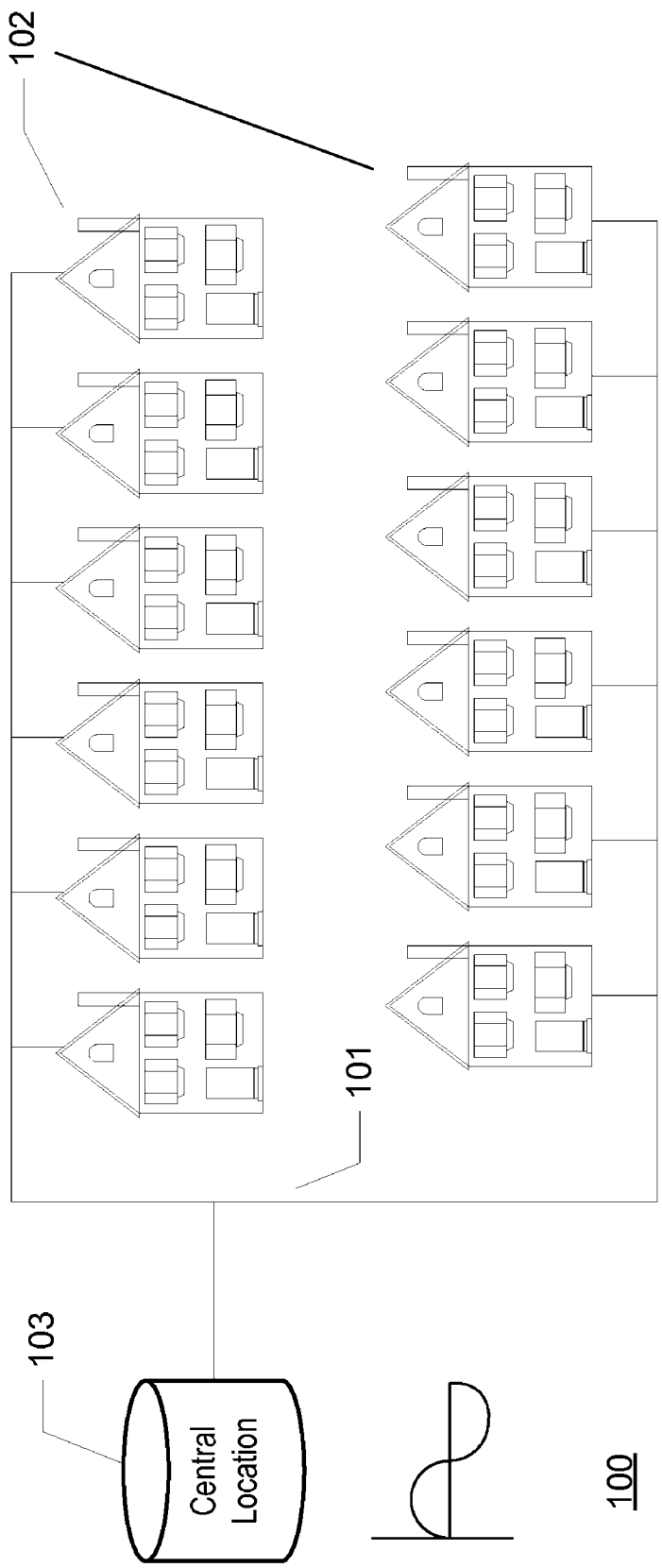
FIG. 1 depicts an illustrative distribution network.

FIG. 1 depicts an illustrative distribution network on which many of the various features described herein may be implemented. Network 100 may be any type of distribution network, such as satellite, telephone, cellular, wireless, etc. The example illustrated is a hybrid fiber/coax distribution network found in many television content distribution networks. Such networks 100 may use a series of interconnected cables, such as fiber optic and/or coaxial cables 101 to connect multiple premises 102 to a network central location 103. The central location may transmit downstream information signals onto the cables 101, and each premises 102 may have one or more receivers and/or tuners used to receive and process those signals.

The cables 101 may be a series of interconnected coaxial cables, fiber optic cables, or any other desired transmission medium. There may be one cable originating from the central location 103, and it may be split a number of times to distribute the signal to various premises (e.g., homes) 102 in the vicinity (which may be many miles) of the central location 103. The cables 101 may include components not illustrated, such as splitters, filters, amplifiers, etc. to help convey the signal clearly, but in general each component introduces a bit of signal degradation. Portions of the cables 101 may also be implemented with fiber-optic cable, with other portions implemented as coaxial cable, resulting in a hybrid fiber/cable network of cables 101. By running fiber optic cable along those portions, signal degradation in those portions may be significantly minimized, allowing a single central location 103 to reach even further with its network of cables 101 than before.

The central location 103 may include a server configured to handle communications with the premises 102 using whichever communication medium is available. For example, in a coaxial cable or hybrid fiber/coax system, the central location 103 may include a termination system, such as a cable modem termination system (CMTS), which may be a computing device configured to manage communications between devices on the network of cables 101 and back end devices such as content sources (e.g., video on demand servers, remote DVR web servers, television program sources, etc.), central location computers and other networks. The CMTS may be as specified in the Data Over Cable Service Interface Specification (DOCSIS) standard, published by Cable Television Laboratories, Inc. (a.k.a. CableLabs), or it may be a similar or modified device instead. The CMTS may be configured to place data on one or more downstream frequencies to be received by modems, such as cable modems, at the various premises 102, and to receive upstream communications from one or more modems on one or more upstream frequencies, as well as to serve as an interface to devices and networks that are further upstream, such as other Internet devices. Similar types of central location systems may be used for other types of networks, such as an optical fiber termination system for optical media, telephone line DSLAM (Digital Subscriber Line Access Multiplexer) for telephone lines, satellite transceiver, cellular telephone station, local area wireless (e.g., WiMax), etc.

Figure 2:
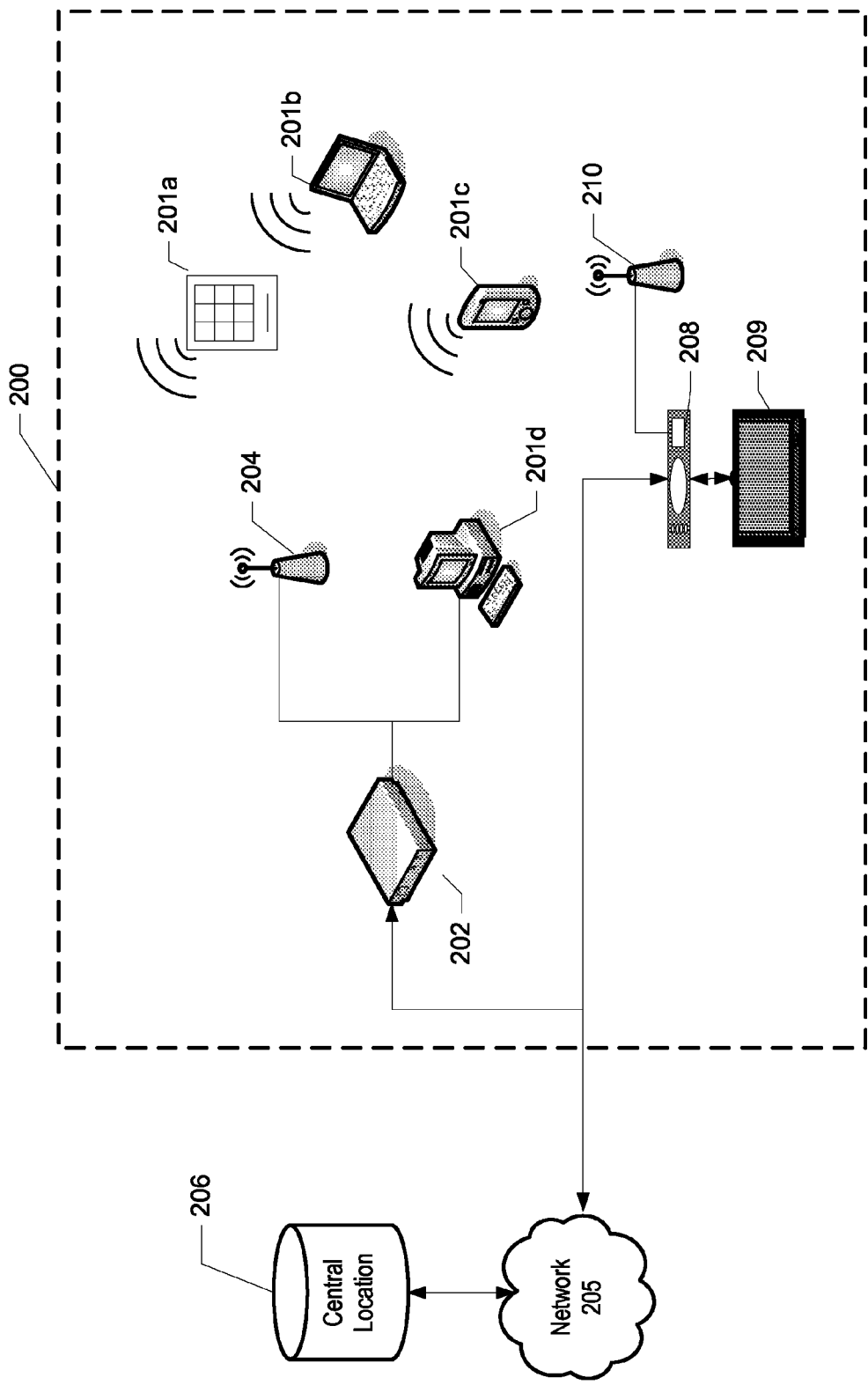
FIG. 2 is a block diagram showing an illustrative system for a distribution premises that may be connected to a distribution network.

FIG. 2 is a block diagram showing an illustrative system for premises that may be connected to a distribution network, in which many of the various features described herein, may be implemented. The distribution network may connect a distribution network central location 206 ("network central location" or "central location") to a downstream premises. In some arrangements, the connection may be provided via linking (e.g., wireless or by using communication cables such as coaxial, fiber, etc.) the central location with a gateway device 202 ("gateway"). The gateway device 202 may be a computing device configured to communicate over a network and with a distribution network central location 206. The gateway 202 may be embodied using various devices, including, for example, a cable modem configured to communicate with the CMTS at the central location 206, a USG device, etc.

The gateway device 202 may be connected to a variety of devices within the premises 200, and may coordinate communications among those devices and between the devices and networks outside the premises 200 (e.g., between a device and the central location 206 through network 205). In some arrangements, gateway 202 may include one or more communication devices 204. Communication device 204 may be a wireless router, a Bluetooth® device, an infrared device, a radio frequency (RF) device, RF4CE radio, etc. The communication device 204 may provide various devices within the premises (e.g., network interface device 208, remote control 201*a*, personal computer 201*b*, cellular and/or smart phone 201*c*, personal digital assistant, etc.) connectivity with gateway 202. Accordingly, in some arrangements, gateway 202 may transmit data to and/or receive data from the various devices connected through communication device 204. Gateway 202 may also provide various devices of the premises 200 (e.g., remote control 201*a*, personal computer 201*b*, cellular and/or smart phone 201*c*, computer 201*d*, etc.) with connectivity to external networks. For example, in one type of network, the gateway 202 may include a cable modem (e.g., a DOCSIS device communicating with CMTS), and may offer Internet connectivity to one or more computing devices within the premises. As another example, the gateway 202 may coordinate communication between a device, such as remote control 201*a*, and the central location 206.

The gateway 202 may communicate with the various devices within the home using any desired connection and protocol. For example, an in-home Multimedia Over Coax Alliance (MoCA) network may use a coaxial cable network within the premises to distribute signals to various devices. Alternatively, some or all of the connections may be of a variety of formats (e.g., MoCA, Ethernet, HDMI, DVI, twisted pair, etc.), depending on the particular device. The connections may also be implemented wirelessly, using local Wi-Fi, WiMax, Bluetooth®, or any other desired format. In some arrangements, the gateway 202 may include authorization settings that specify which devices are allowed to communicate with the gateway 202 and/or the type of information that may be transmitted from and/or received by the gateway device 202. Additionally and/or alternatively, the information transmitted to and/or received by the gateway 202 may be encrypted.

According to one or more aspects of this disclosure, the distribution network may include a heterogeneous mix of one way and two way devices. As illustrated in FIG. 2, premises 200 may include one or more network interface devices 208, which may be set-top boxes (STBs), digital video recorders (DVRs), single tuner devices, digital-to-analog devices, etc. The network interface device 208 may receive and decode content from the distribution network and may provide that content to users for consumption, such as for viewing on a television 209. Alternatively, the television 209 may contain the functionalities of network interface device 208. Any type of content, such as video, video-on-demand, audio, Internet data, electronic program guides (EPG), services distributed via switch digital video, etc., may be accessed in this manner. In some arrangements, the network interface device's functionality may be incorporated with the gateway 202, so that the gateway 202 receives and decodes content from the distribution network and supplies it to the televisions for display.

Additionally, network interface device 208 may include communication device 210. Communication device 210 may be a wireless router, a Bluetooth® device, an infrared device, RF device, RF4CE radio, etc. The communication device 210 may provide various devices within the premises (e.g., remote control 201a, personal computer 201b, cellular and/or smart phone 201c, etc.) connectivity with network interface device 208. Accordingly, in some arrangements, network interface device 208 may transmit data to and/or receive data from the various devices connected through communication device 210.

In at least some embodiments, network interface device 208 (or a television 208 having the functionality of network interface device 208) may be a one way network interface device. Generally, a one way network interface device may receive and decode content from the distribution network, but is unable to transmit data upstream to the central location. In some arrangements, the one way network interface device may be a digital to analog device that receives content from the distribution network. Such digital to analog devices may include a single downstream decoder or tuner capable of tuning to one or more video channels. In these embodiments, conventional interactivity (e.g., interactivity through a STB including an upstream tuner and/or upstream modulator) may not be possible. Additionally, in some embodiments the digital to analog device may not include a device that allows clients to view and/or record digital cable television channels, such as a CableCARD. In other arrangements, the one way network interface device may be a digital video recorder or other similar device (e.g., TiVo® DVR, etc.), as will be appreciated by one skilled in the art. Such digital video recorders may include device such as a CableCARD. Without provisions for communicating with the network central location, a user of a one way device may not be able to receive and/or consume interactive services including video-on-demand, audio, Internet data, services distributed via switched digital video, electronic program guides (EPG), etc.

In some embodiments where the network interface device 208 is a one way device, gateway 202, network interface device 208, and one or more various devices of the premises (e.g., remote control 201a, etc.) may be configured to provide communication to the network central location 206 so that the central location 206 may provide the user of the one way device with interactive services. For example, the various devices may be configured to transmit data to/from the one way device and/or the gateway and receive input from a user; the gateway may be configured to transmit data to/from the various devices, the one way device, and/or the network central location; and the one way device may be configured to transmit data to/from the various devices and/or the gateway. Further, in some arrangements, the various devices, the gateway, the one way device and/or the network central location may be configured to process and/or store information related to the state of one or more devices included in the system (e.g., the state of the one way device), and transmit such data between the devices that are able to communicate with each other accordingly. Such state information may include the currently tuned channel and/or frequency of the one way device, information related to whether a message/command was successfully received and/or processed by the one way device, information related to the current interactive service being provided by the network central location, etc.

Figure 3:
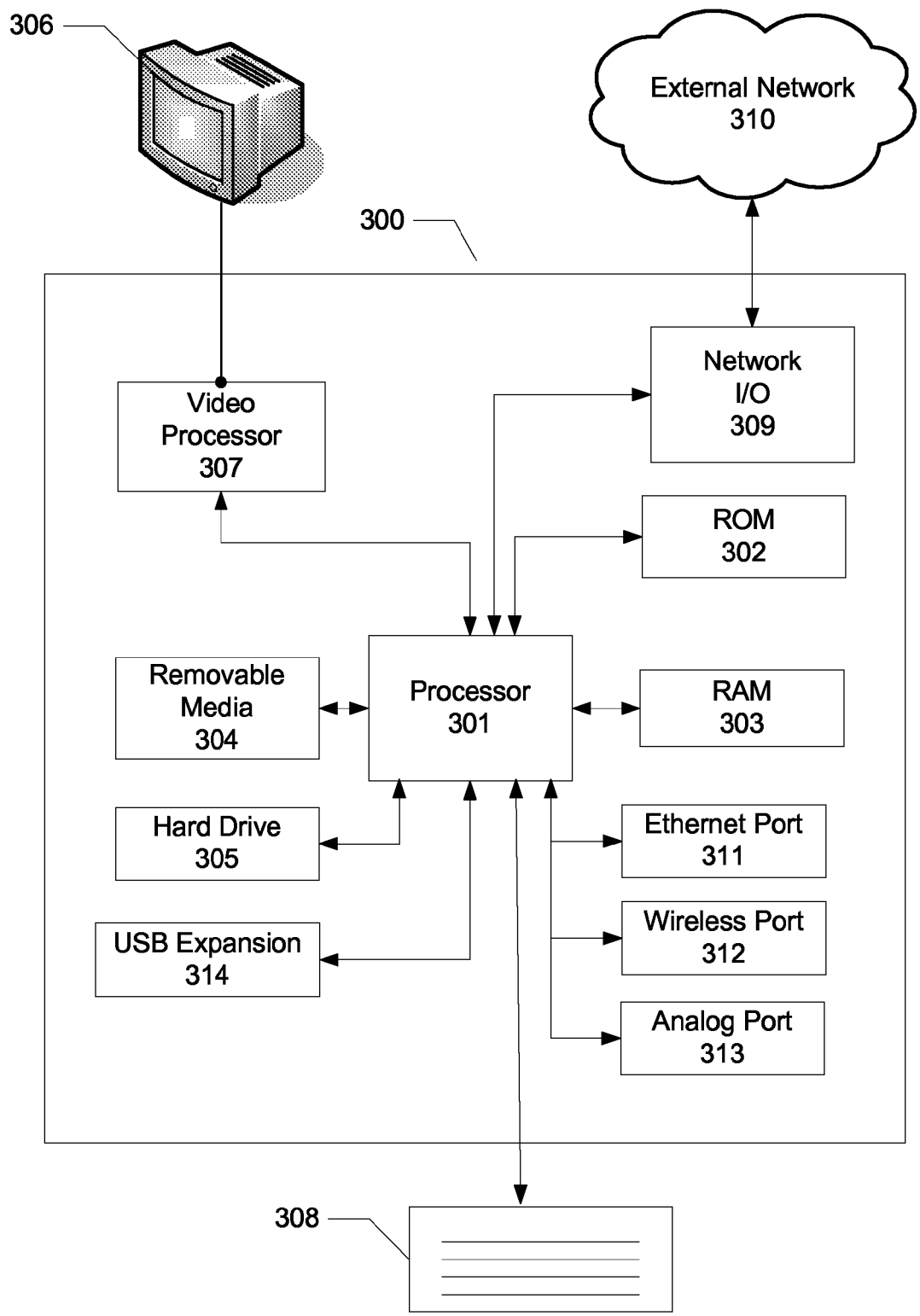
FIG. 3 illustrates a computing device that may be used to implement various devices described herein.

FIG. 3 illustrates a computing device that may be used to implement various devices described herein (e.g., gateway 202 of FIG. 2, etc.). The computing device 300 may include one or more processors 301, which may execute instructions of a computer program to perform any of the features described herein. Those instructions may be stored in any type of computer-readable medium or memory, to configure the operation of the processor 301. For example, instructions may be stored in a read-only memory (ROM) 302, random access memory (RAM) 303, removable media 304, such as a Universal Serial Bus (USB) drive, compact disk (CD) or digital versatile disk (DVD), floppy disk drive, or any other desired electronic storage medium. Instructions may also be stored in an attached (or internal) hard drive 305. The computing device 300 may include one or more output devices, such as a display 306 (or an external television connected to a set-top box), and may include one or more output device controllers 307, such as a video processor. There may also be one or more user input devices 308, such as a remote control, keyboard, mouse, touch screen, microphone, etc. The computing device 300 may also include one or more network input/output circuits 309, such as a network card to communicate with an external network 310. The network interface may be a wired interface, wireless interface, or a combination of the two. In some embodiments, the interface 309 may include a cable modem, and network 310 may include a cable television system's coaxial, fiber, or hybrid fiber/coaxial distribution system (e.g., a DOCSIS network).

The computing device 300 may include a variety of communication ports or interfaces to communicate with the various home devices. The ports may include, for example, Ethernet ports 311, wireless ports or interfaces 312, analog ports 313, and any other port used to communicate with devices in the home. These communication ports or interfaces, with other portions of the computing device 300 (e.g., the processor 301 and the network I/O 309), may facilitate communication between the various home devices (e.g., devices connected on an internal network) and the computing device 300. Using the communication ports, the computing device may communicate with the various devices within the home using any desired connection and protocol. For example, a MoCA network may use a coaxial cable network within the premises to distribute signals to various devices. Alternatively, some or all of the connections may be of a variety of formats (e.g., MoCA, Ethernet, HDMI, DVI, twisted pair, etc.), depending on the particular device. The connections may also be implemented wirelessly, using local Wi-Fi, WiMax, Bluetooth®, or any other desired format. Additionally and/or alternatively, the information sent/received by the computing device 300 may be encrypted. In some arrangements, the computing device 300 may transmit messages to and/or receive messages from one or more of the various devices located throughout the premises. For example, the computing device 300 may transmit a request for particular data (e.g., data stored by a separate digital video recorder) and, in response, the computing device 300 may receive the requested data (e.g., from the digital video recorder via MoCa, WiFi, quadrature amplitude modulation (QAM), etc.).

The computing device 300 may also include one or more expansion ports 314. The expansion ports 314 may allow the user to insert an expansion module to expand the capabilities of the computing device 300. As an example, the expansion port may be a Universal Serial Bus (USB) port as illustrated in FIG. 3, and can accept various USB expansion devices. The expansion devices may include memory, general purpose and dedicated processors, radios, software and/or I/O modules that add processing capabilities to the computing device 300.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 4:
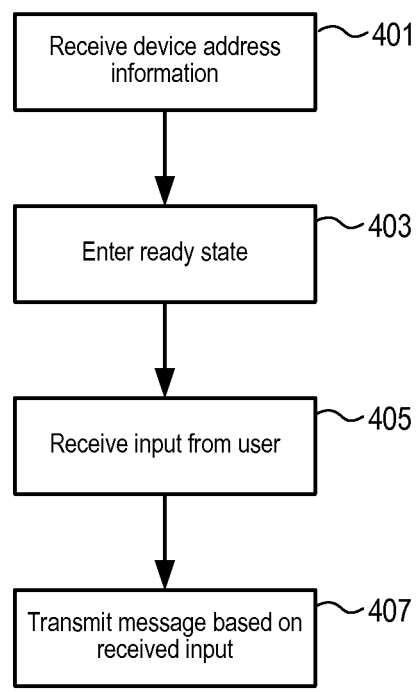
FIG. 4 is a flow chart of an illustrative method for providing data communication to a gateway device and/or a one way device using a communication device, according to one or more aspects of this disclosure.

One or more aspects of this disclosure relate to a method that provides data communication upstream to the network central location. Such a method allows for greater functionality, customization and/or interactivity to users of one way devices, such as digital to analog devices that may have only a single downstream tuner. For example, providing communication to the network central location may allow the user to receive interactive services of a conventional STB, including video-on-demand, audio, Internet/web services, services distributed via switched digital video, electronic program guides (EPG), etc. FIG. 4 is a flow chart of an illustrative method for providing data communication to a gateway device and/or a one way device using a communication device, according to one or more aspects of this disclosure. As discussed above, such communication devices may be embodied by various devices including a remote control (e.g., a ZigBee® RF4CE remote control), a personal computer, a cellular and/or smart phone, a personal digital assistant, and/or an input device to a gateway device (e.g., a keyboard for the gateway device).

At step 401 of FIG. 4, the user (or computer) operated communication device receives device address information. Such address information may include the address information of the one way device and/or the gateway device. The received address information provides the communication device information required by the system to communicate with the one way device and/or the gateway device. For example, the system may require the address information of the one way device so the network central location may communicate appropriately downstream to the one way device. As will be appreciated by one skilled in the art, the address information may include one or more MAC addresses, Internet addresses, serial numbers, model numbers, etc. In some arrangements, such address information may be supplied by the user. At step 403, the communication device enters a ready state. Generally, when in the ready state, the communication device is able to transmit messages to the gateway and/or one way device.

At step 405, the user (or computer) operated communication device receives input from a user. In some embodiments, the received input is based on a particular key or button press by the user on the communication device (e.g., the remote control, the personal computer, etc.) or could be any type of other input command. In one example, a user may actuate a key with the desire to control a function of the one way device, including controlling and/or interacting with an interactive service being consumed by the user at a television operably connected to the one way device. As one skilled in the art may appreciate, the particular types of user input for communication devices include types of input well known in the art (e.g., channel up, channel down, menu, guide, page up, page down, fast forward, rewind, buttons for number 0-9, etc.)

At step 407, the communication device transmits the message based on the received input. In some arrangements, the message may be transmitted to the gateway device and/or the one way device. Additionally, in some embodiments, the message may be transmitted based on, for example, the button press and/or the one way device. For example, a message corresponding to a channel up or channel down may be transmitted to the one way device, while a message corresponding to interactions, for example, with an EPG menu may be transmitted to the gateway device. As another example, a message may be transmitted to the one way device depending on whether the one way device includes a communication device (e.g., the communication device 210 of FIG. 2) capable of receiving transmissions from the communication device. In some arrangements where the one way device does not include a communication device capable of receiving transmissions from the communication device, all messages may be sent to the gateway device to be subsequently sent upstream to the central location, where, as discussed in detail below, the central location may process the messages and transmit information downstream to the gateway, the one way device, and/or one or more additional devices.

Figure 5:
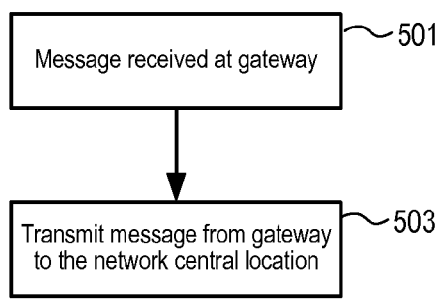
FIG. 5 is a flow chart of an illustrative method for providing data communication to a network central location via a gateway device, according to one or more aspects of this disclosure.

FIG. 5 is a flow chart of an illustrative method for providing data communication to a network central location via a gateway device, according to one or more aspects of this disclosure. At step 501, a message is received at the gateway. In some arrangements, the gateway device may receive messages from the communication device and/or the one way device. In various embodiments, the received messages may include information related to an interactive service (e.g., data associated with initiating the viewing of a particular interactive service such as an EPG, data associated with ending a session of a particular interactive service, etc.), information related to user input received at the communication device (e.g., data associated with actuating keys for channel down or channel up functions, an alphanumeric character input at the communication device for a text input function of the current interactive service, data identifying that a selection has been made for the current interactive service, data associated with moving a focus of the current interactive service, such as an EPG, etc.), and/or information related to the state of the various devices, such as the one way device (e.g., address information of the one way device, currently tuned channel and/or frequency, last received message from server central location, error messages, etc.). Additionally and/or alternatively, the received messages may include information related to particular types of content transmitted from the central location to the one way device (e.g., whether certain content such as an advertisement is being displayed and/or displayed correctly, etc.), and/or information related to periodic messages from the one way device (e.g., periodic messages indicating that the one way device is receiving content from the central location and/or that the one way device is powered on, etc.).

At step 503, the gateway transmits a message to the network central location. The content of the message transmitted from the gateway provides the network central location with data representing the commands and/or information for interacting with an interactive service the network central location may provide to the one way device. For example, the content of the message may provide the network central location with the user input received at the communication device (e.g., a page up or page down command, an input interacting with the current interactive service displayed on a television operably connected to the one way device, etc.). As another example, the content of the message may provide the network central location with information related to the state of the one way device (e.g., address information of the one way device, currently tuned frequency of the one way device, etc.). As yet another example, the content of the central location the message may include information related to an interactive service (e.g., data associated with initiating the viewing of a particular interactive service such as an EPG, data associated with ending a session of a particular interactive service, etc.). In some embodiments, the gateway may process the received message before transmitting the central location message to the network central location. For example, the received message may be repackaged (e.g., create a new IP packet addressed to the central location) so that the contents of the received message may be transmitted to the network central location as the central location message. In other embodiments, the gateway may combine the content of one received message with the content of other received messages before transmitting the central location message to the network central location (e.g., combine a message having contents related to user input received at the communication device with the latest message received at the gateway having contents related to the state of the one way device).

Figure 6:
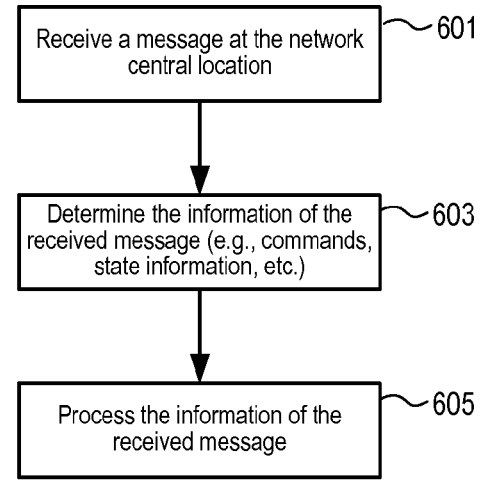
FIG. 6 is a flow chart of an illustrative method for providing data communication downstream to a one way device from a network central location, according to one or more aspects of this disclosure.

FIG. 6 is a flow chart of an illustrative method for providing data communication downstream to a one way device from a network central location, according to one or more aspects of this disclosure. At step 601, a message is received at the network central location. At step 603, the network central location determines the information contained in the received message. In some embodiments, the received message may have been transmitted from a gateway device. Accordingly, the message may provide the network central location with data representing commands and/or other information for interacting with an interactive service being provided by the network central location to the one way device. As discussed more fully above, such messages may include user input received at a communication device, information related to the state of the one way device, information related to an interactive service, etc.

At step 605, the network central location processes the information of the received message. For example, if the message includes the state of the one way device, the network central location may update the stored state information for the one way device (e.g., a stored local state machine representing the current state of the one way device) and/or store the information for future use (e.g., store the address information so that the central location may properly unicast the interactive service to the one way device). As another example, if the message includes a command for an interactive service, the network central location may process (e.g., generate, modify, composite, etc.) the interactive service being provided to the one way device according to the command. Processing some commands (e.g., page up, page down, etc.) requires the network central location to process a change in the user interface of the interactive service. When processing some commands, the network central location may perform the change, process the user interface and then transmit the user interface to the one way device via the distribution network. In some arrangements, the user interface may be transmitted over an MPEG (e.g., MPEG-2) channel. Additionally, in some embodiments (e.g., embodiments where commands from the communication device are transmitted to the gateway and then upstream to the central location), a command may require the distribution network interface to transmit a message to the one way device that forces the one way device to tune to a particular channel, frequency, and/or program identifier (e.g., number, code, etc.) having the transmitted video for the interactive service. In some arrangements, the network central location may transmit the desired channel and/or frequency to the one way device, and may perform the processing necessary to set up and transmit video for the interactive service on the desired channel, frequency, and/or program identifier. For example, a command may be received to begin a video on demand service. In one example, the network central location may allocate resources for the video on demand service, including determining the location information for the interactive service, such as a particular channel, frequency, and/or program identifier for the service. The network central location may then transmit a message having the location information on the frequency the one way device is currently tuned so the one way device will receive the location information and be able to tune to the determined channel, frequency, and/or program identifier. Upon transmitting the force tune message to the one way device, the network central location may then transmit the video stream for the interactive service on the determined frequency. Additionally, the network central location may transmit, based on the received command, messages to one or more additional devices within the premises of the one way device (e.g., a two way device in the same premises). In some arrangements, the network central location and the one or more additional devices within the premises may interact with each other based on the received command (e.g., transmitting a plurality of messages between the central location and the one or more additional devices).

Figure 7:
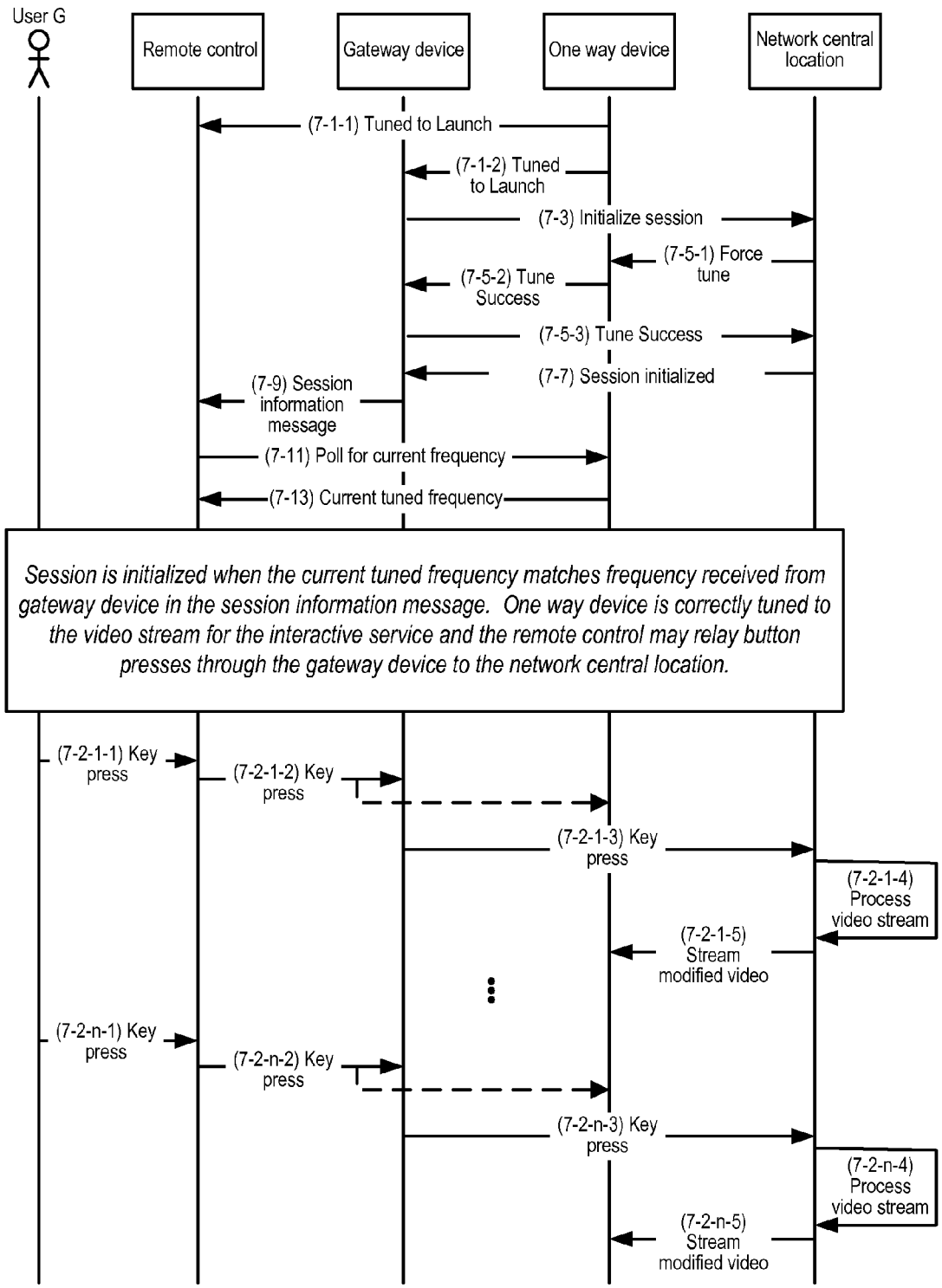
FIG. 7 depicts an illustrative process flow for creating and for maintaining a session with an interactive service, and interacting with an interactive service, according to one or more aspects of this disclosure.

In some embodiments, for the communication device and/or gateway device to properly provide interactivity with an interactive service being transmitted from the network central location to the one way device, the communication device and/or gateway device may require particular state information of the one way device. In some arrangements, the communication device and/or gateway device may require notification when a session for an interactive service is being started. The state information may be required because the functionality associated with input from a user may change based on the current interactive service. For example, the buttons of a remote control may provide a first set of functions when the user interacts with a video-on-demand service, and the buttons of the remote control may provide a second set of functions when the user interacts with an EPG service. FIG. 7 depicts an illustrative process flow for creating and for maintaining a session with an interactive service, and interacting with an interactive service, according to one or more aspects of this disclosure. In the embodiment illustrated in FIG. 7, the communication device may be a remote control being operated by User G (e.g. a ZigBee® RF4CE remote control), and the one way device may be a digital to analog device (DTA device) having a single downstream tuner. Lines 7-1-1 through 7-1-2 represent messages transmitted from the one way device when the one way device is tuned to a launch channel (e.g., a channel that redirects the one way device to a unicast session channel) for an interactive service, such as a video on demand, EPG, web service, etc. These messages provide notification to the receiving devices that the one way device is beginning a session for the interactive service. Upon receiving the message, the devices may configure themselves to be in a particular mode corresponding to the interactive service. For example, when a video on demand session is beginning, the remote control may enter a "video on demand mode" that provides the user with the buttons associated with a video on demand service that the user may press and/or actuate to control and/or interact with the video on demand service.

In line 7-3, the modem transmits a message to the network central location to initialize a session for the interactive service. Upon receiving the message, the network central location allocates resources for the interactive service that will be provided to the one way device. For example, when allocating resources for an EPG or web service, the network central location may generate and/or modify a guide and/or web browser view. Additionally, allocating resources may include determining the location information for the video stream, such as the specific channel, frequency and/or program identifier on which the video stream will be unicast to the one way device. Further, allocating resources may include allocating the necessary resources for the determined channel, frequency, and/or program identifier of the interactive service's video stream.

After the central location allocates the appropriate resources, as seen at line 7-5-1, a message is sent from the central location to the one way device that forces the one way device to tune to the specific channel, frequency and/or program identifier. The network central location may transmit the unicast stream for the interactive service on that specific frequency to the one way device. In some arrangements the network central location, using an MPEG encoder, may transmit the unicast video stream using an MPEG channel (e.g., MPEG-2 channel). Upon receiving the message from the central location, the one way device may attempt to tune to the specific channel, frequency and/or program identifier and may report whether the tune was successful. As seen at line 7-5-2, in some arrangements where the tune is successful, the one way device may transmit a message to the gateway indicating that the tune was a success. Upon receiving the message at the gateway, as seen at line 7-5-3, the gateway may transmit the message to the central location. In some arrangements where the tune is not successful, the one way device may display an error message and/or may transmit a message to the central location via the gateway indicating that the tune was not a success (not shown).

In line 7-7, the central location transmits downstream to the gateway device the location information for the interactive service session (e.g., the specific channel, frequency, and/or program identifier that the interactive service session will be unicast on). As seen in line 7-9, upon receiving this information, which indicates the session has been initialized, the gateway device transmits a message to the remote control that relays the specific channel, frequency, and/or program identifier to the remote control. When the message is received by the remote control, the specific channel, frequency, and/or program identifier is stored and, as seen in line 7-11, the remote control polls the one way device for the channel, frequency, and/or program identifier that the one way device is currently tuned to. In other arrangements, the one way device may transmit to the gateway device and/or the remote control the location information for the interactive service session (e.g., the specific channel, frequency, and/or program identifier received at the one way device in the message of line 7-5-1).

As seen in line 7-13, the one way device responds by transmitting its currently tuned channel, frequency, and/or program identifier to the remote control. The remote control, upon receiving a response from the one way device, determines whether the one way device's current state (e.g., current channel, frequency and/or program identifier) matches the stored channel, frequency and/or program identifier received from the gateway device. If they do not match, the remote control transmits another poll. In some arrangements, the remote control may be configured to continue polling until they match. In other arrangements, the polling may continue for a set number of polls or for a set time interval, upon which an error message may be displayed to a user and/or transmitted to various devices (e.g., the one way device, the modem, the central location through the gateway, etc.). If they do match, the session has been properly initialized and the one way device has been correctly tuned to the video stream for the interactive service. Additionally, in some arrangements, when they match, the remote control may begin relaying user button presses through the gateway device to the network central location to interact with the interactive service.

As shown generally by lines 7-2-1 through 7-2-n, a user may interact with the interactive service by pressing/actuating a button and/or key on the remote control. As seen in line 7-2-1-1, the remote control receives input from User G when User G presses/actuates a key on the remote control. This information is relayed to the gateway device from the remote (e.g., over RF in arrangements where the remote is an ZigBee® RF4CE remote) at line 7-2-1-2. In some arrangements, this information may also be relayed to the one way device from the remote (shown by dashed portion of line 7-2-1-2). Next, the gateway device transmits the information representing the key press to the central location at line 7-2-1-3. As seen in line 7-2-1-4, upon receiving the information representing the key press, the central location processes the information accordingly and processes (e.g., generates, modifies, etc.) the video stream according to the command represented by the key press (e.g., page up, page down, enter, back, forward, etc.) In line 7-2-1-5, the central location then transmits the modified video in the unicast stream to the one way device, where the video may be consumed by User G (e.g., viewed at a display associated with the one way device). As seen in FIG. 7, an arbitrary number of interactions may occur in an interactive service session.

In some arrangements, the distribution network may distribute video and/or services via switched digital video. According to one or more aspects of this disclosure, a network central location may be configured to allocate resources, receive messages requesting the allocation of resources and/or transmit messages to downstream devices so that one way devices may be provided with video and/or services distributed via switched digital video (SDV). When video and/or services are distributed via switched digital video in an arrangement involving a central location and a conventional two way device, the two way device is able to request a SDV channel and the network central location is able to allocate resources and transmit the SDV channel accordingly. One way devices, as discussed above, generally do not communicate from the one way device upstream to a network central location. Therefore, one way devices may not conventionally be able to request the allocation of a SDV channel, may not conventionally be able to consume SDV channel content, and/or may only view video being transmitted over a SDV channel if a two way device in the same distribution network has previously requested allocation of the SDV channel. However, the network central location may be configured to allocate resources for a SDV channel based on messages received from a gateway device and then communicate information related to the allocated resources to a one way device. In some embodiments, with reference to FIG. 6, the network central location may be configured to allocate resources for a SDV channel based on the central location message received at step 601. For example, if the network central location distributes video and/or services via SDV, the network central location may allocate a SDV channel for the interactive service and/or video stream associated with the interactive service (e.g., a video selected during a video on demand session, etc.). In other embodiments, with reference to FIG. 7, the network central location may be configured to allocate resources for a SDV channel based on the initialize session message transmitted from the gateway device to the central location in line 7-3.

FIG. 8 is a flow chart of an illustrative method for allocating resources for video distributed via switched digital video. At step 801, a message is received at the network central location from a gateway device associated with a one way device. The network central location is configured to allocate resources for an SDV channel upon receiving the message. As seen in step 803, the network central location allocates the resources for the SDV channel.

In some embodiments, the SDV channel may be allocated for a determined interval of time (i.e., timeframe of the SDV channel). For example, the network central location may determine the interval of time based on various factors of the distribution network, including bandwidth, channel usage, etc. As another example, the interval of time may be predetermined. In some embodiments having a timeframe for the SDV channel, when the interval of time expires, the resources may be unallocated by the network central location. When the resources are unallocated, the central location will cease transmitting the associate video. Thus, if a distribution network interface device attempts to tune to the SDV channel after it has been unallocated, the expected video will not be received by the network interface device. In other arrangements having a timeframe for the SDV channel, when the interval of time expires, the resources may be unallocated only when the central location requires the resources.

At step 805, the network central location transmits location information for the SDV channel to the one way device associated with the gateway device. Such location information may include the specific channel, frequency and/or program identifier of the SDV channel. Additionally, in some arrangements, the location information may include the timeframe of the allocated SDV channel. At step 807, the network central location transmits video over the allocated SDV channel. The one way device may then tune to the SDV channel so the user of the one way device may consume the video on a television operably connected to the one way device.

In some arrangements, the network central location may be configured to transmit a message to all network interface devices (e.g., both one way and two way devices, etc.) of the distribution network when the network central location allocates resources for an SDV channel (e.g., allocated from a message received from a gateway device and/or when SDV channels are allocated from a request from a two way device, etc.). For example, the network central location may transmit (e.g., via the out of band (OOB) tunnel, DOCSIS set-top gateway (DSG) tunnel, etc.) a message to all distribution network interface devices to notify the devices of the SDV channel allocation, where the devices may tune to receive the SDV channel, the timeframe for the SDV channel, etc. In some arrangements, upon receiving such messages, the distribution network interface devices may store the information so that the network device may tune to the appropriate location when the user wishes to consume video being broadcast over an SDV channel, which is currently being broadcast by the central location. In other arrangements, upon receiving such messages, the distribution network interface devices may update a locally stored channel map based on the received message. In some arrangements this locally stored information may be displayed to a user on a television.

According to one or more aspects of this disclosure, a network central location may pre-allocate SDV resources. Pre-allocation of resources may allow one way devices and/or two way devices having intermittent/failed upstream communication with the central location to tune into the channel at a future time and properly receive the video the user desired on the SDV channel. In some arrangements, the network central location may pre-allocate switched digital video resources based on communication between a two way device and a network central location (e.g., a set top box with downstream and upstream communication with the central location).

FIG. 9 is a flow chart of an illustrative method for pre-allocating resources for an SDV channel based on communication between a two way device and a network central location. At step 901, the network central location receives a pre-allocation message from a distribution's two-way device. In some embodiments, the pre-allocation message may be a plurality of program identities and/or SDV channel identities. For example, the pre-allocation message may be a schedule of programs and/or SDV channel identities that have been selected at the two way device. In some arrangements, the selections may be made by a user of the two way device. In other arrangements, the selections may be made by the two way device. For example, the two way device may have digital video recorder (DVR) capability. In this example, the pre-allocation message may be generated based on the DVR's program recording schedule. In some arrangements, the pre-allocation may be the DVR's program recording schedule. Additionally, the pre-allocation message may be generated to include the programs and/or SDV channel information of the DVR program recording schedule that are within a particular time period (e.g., one day, 7 days, etc.). Generally, a DVR may receive its program recording schedule in various manners, including program selections from a user (e.g., program selections made by the user from the two way device's guide data), selections made by the two way device (e.g., recommended programs the DVR determines the user may enjoy based on user viewing habits/preferences/likes/dislikes), etc.

At step 903, the network central location allocates SDV resources based on the received pre-allocation message. In some arrangements, the network central location may modify a channel map having the schedule of SDV channel resources based on the pre-allocation message. In these arrangements, the channel map provides a schedule of the SDV channels, the timeframe for the SDV channels, the location information of the SDV channel, etc. In other arrangements, the network central location may modify a plurality of channel resource tables that describe the allocated SDV channel resource schedule. The plurality of tables may include a carrier definition table that provides a mapping of the virtual channels to particular frequencies and program identifiers, a network text table that provides the network text and virtual channel numbers associated with the network text (e.g., channel names and channel numbers), a virtual channel table, and/or guide data (e.g., a program schedule for the plurality of channels). Additionally, in some embodiments, the network central location may be configured to modify the SDV channel resource schedule only for a particular area and/or location. For example, an SDV channel may be allocated for the network interface devices in a particular area and/or location. Accordingly, the network central location would modify the SDV channel resource schedule for the network interface devices of that area/location, etc.

At step 905, the network central location may then transmit the modified SDV channel resource schedule to the distributions' network interface devices. For example, the network central location may transmit (e.g., via the out of band (OOB) tunnel, DOCSIS set-top gateway (DSG) tunnel, etc.) a message to all distribution network interface devices to notify the devices of the SDV channel being broadcast, where the devices may tune to receive the SDV channel, the timeframe for the SDV channel, etc. As another example, the network central location may transmit the modified channel map to the distributions' network interface devices. As yet another example, the network central location may transmit one or more of the plurality of channel resource tables, which describe the allocated SDV channel resource schedule. (e.g., the carrier definition table, the network text table, virtual channel table, and/or guide data). In some arrangements, upon receiving such messages, the distribution network interface devices may store the information so that the network device may tune to the appropriate location when the user wishes to consume video being broadcast over an SDV channel, which is currently being broadcast by the central location. In other arrangements, upon receiving such messages, the distribution network interface devices may update a locally stored channel map based on the received message. In some arrangements this information may be displayed to a user on a television. Providing the one way devices with the modified SDV channel map allows the one way devices to correctly tune to a SDV channel location and properly receive the video of that SDV channel.

In some arrangements, the network central location may be configured to periodically broadcast information related to the allocated SDV channel resource schedule. For example, the network central location may periodically transmit (e.g., via the out of band (OOB) tunnel, DOCSIS set-top gateway (DSG) tunnel, etc.) the modified channel map to the distributions' network interface devices. As another example, the network central location may periodically transmit one or more of the plurality of channel resource tables, which describe the allocated SDV channel resource schedule (e.g., the carrier definition table, the network text table, virtual channel table, and/or guide data). In some arrangements, when transmitting one or more of the plurality of channel resource tables, the network central location may transmit particular tables more frequently than other tables (e.g., guide data is transmitted more frequently than the carrier definition table, etc.). In other arrangements, the network central location may periodically transmit based on the type of receiving network interface device. For example, the network central location may transmit to one way devices more frequently than to two way devices (e.g., transmit to one way devices every minute, but to two way devices every hour). Additionally, the network central location may determine what portions of the SDV channel resource schedule to transmit based on the type of the receiving network interface device. For example, the network central location may transmit the network text table and/or the virtual channel table to one way devices, while transmitting the carrier definition table, the network text table, and the guide data to two way devices.

In some embodiments, the network central location may be configured to change one or more resources of an allocated SDV channel (e.g., the allocated frequency, channel, and/or program identifier, etc.). In these embodiments, the network central location may be configured to transmit a change request to one or more of the distribution network's two way devices. For example, the network central location may determine that a resource for an allocated SDV channel needs to be changed (e.g., the frequency at which the channel will be broadcast) when allocating resources for a new SDV channel. As another example, the network central location may determine that a resource for an allocated SDV channel needs to be changed based on various factors of the distribution network including bandwidth, channel usage, etc. In some arrangements, the network central location selects which two way devices to transmit the change request based on which devices can tune to the allocated SDV channel when the SDV channel is being transmitted (e.g., transmit the change request to the two-way devices in the location for which the SDV channel is being allocated, etc.). Upon receiving the change request, the one or more two way devices may respond to the change request (e.g., acknowledgement message). In some arrangements, if the network central location receives a particular number of responses, the change to the SDV channel resource will be performed. If the network central location does not receive the particular number of responses (e.g., some devices may be offline, etc.), the network central location may select to change the one or more resources of a different allocated SDV channel (e.g., a substitute SDV channel) and transmit a second change request.

Figure 10:
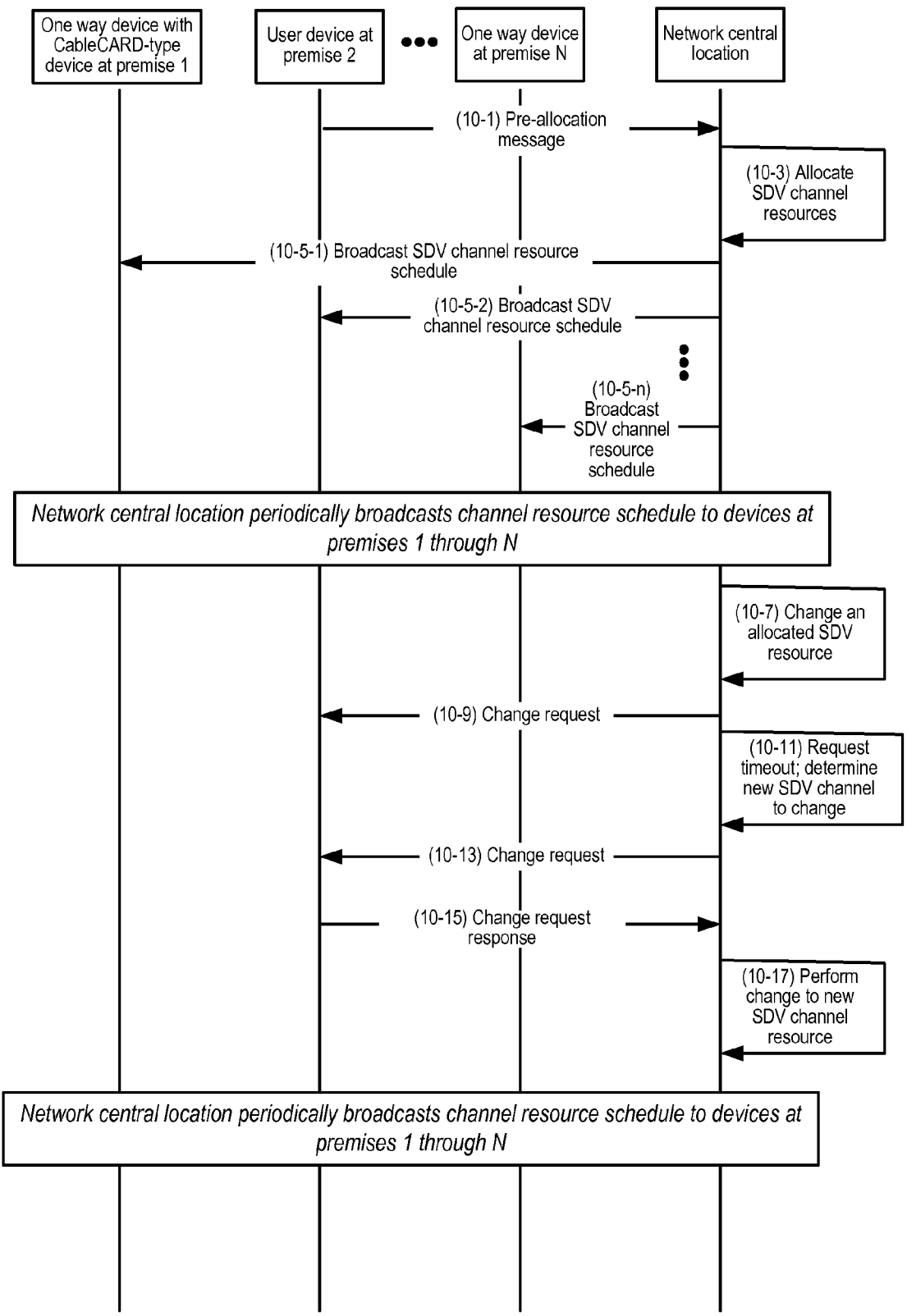
FIG. 10 shows an illustrative process flow for pre-allocating resources for SDV channels, according to one or more aspects of this disclosure.

FIG. 10 depicts an illustrative process flow for pre-allocating resources for SDV channels, according to one or more aspects of this disclosure. In the embodiment illustrated in FIG. 10, the network central location distributes SDV channels to premises 1 through N. Premise 1 is illustrated as a network interface device that is a one way device with a security card, such as a CableCARD-type device (e.g., TiVo® DVR). Premise 2 has a two way device, such as a set top box, having two way communication with the central location. Premise N has a DTA device having one way communication with the central location. In line 10-1, the two way device of premise 2 transmits a pre-allocation message to the network central location. In line 10-3, the network central location allocates resources according to the received pre-allocation message. Lines 10-5-1 through 10-5-*n* represent messages transmitted from the network central location to the various devices of premises 1-N so that they receive the updated SDV channel resource schedule. Network central location may continue to periodically broadcast the SDV channel resource schedule to the various devices.

Next, the network central location determines that one or more resources need to be changed for the allocated SDV channels. As seen at line 10-9, the central location transmits a change request to the two way device at premise 2. Additionally, and/or alternatively, the central location may transmit to one or more other two way devices of premises 1-N. As seen in line 10-11, the request times out because a response has not been received from the two way device at premise 2. Therefore, the central location determines a new SDV channel to change and, at line 10-13, transmits a new change request. At line 10-15, the set top box acknowledges the change request with a response. Upon receiving the response, the central location performs the change to the resource of the new SDV channel (e.g., changes the frequency at which the channel will be broadcast). Upon changing the SDV channel resource, subsequent broadcasts to premises 1-N of the SDV channel resource schedule will have the modified resource schedule.

Embodiments include a machine readable storage medium (e.g., a CD-ROM, CD-RW, DVD, floppy disc, FLASH memory, RAM, ROM, magnetic platters of a hard drive, etc.) storing machine readable instructions that, when executed by one or more processors, cause a server, gateway, end device or other network device to carry out operations such as are described herein. As used herein (including the claims), a machine-readable storage medium is a physical structure that can be touched by a human. A modulated signal would not by itself constitute a machine-readable storage medium.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. Additional embodiments may not perform all operations, have all features, or possess all advantages described above. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatuses, modules, systems, and machine-readable storage media. Any and all permutations of features from above-described embodiments are the within the scope of the invention.

The invention claimed is:

1. A method comprising:
receiving, by a network device that is at a network location and from a gateway device that is at a user location, a first message that comprises an indication of whether a one way device at the user location and unable to transmit data to the network location is tuned to an interactive service;
after receiving the first message, transmitting, by the network device and to the gateway device, a second message that comprises information identifying a location of the interactive service; and
receiving, by the network device and from the gateway device, a third message that comprises information specifying a current channel, frequency or program identifier of the one way device.

2. The method of claim 1, wherein the third message comprises a command for the interactive service, and wherein the method further comprises:
processing the interactive service according to the command;
after the processing, transmitting the interactive service to the one way device;
receiving, at the gateway device, a fourth message comprising data representing input received at a user communication device associated with the one way device and the gateway device; and
transmitting, from the gateway device, the third message, wherein the command corresponds to the data of the fourth message.

3. The method of claim 2, wherein the one way device is a digital to analog device with only a single tuner, the gateway device is a cable modem, and the user communication device is a remote control, wherein the single tuner is configured to receive signals transmitted from the network location, and wherein the cable modem receives the command from the remote control.

4. The method of claim 1, wherein the interactive service is a video-on-demand service, an audio-on-demand service, an Internet browser service, or an electronic program guide service.

5. The method of claim 2, wherein the interactive service comprises video for display on a display associated with the one way device.

6. The method of claim 2, wherein the location is a channel, frequency or program identifier, and wherein the third message further comprises information specifying an address of the one way device.

7. The method of claim 1, further comprising:
allocating, by the network device, resources for the interactive service and determining the location, wherein the location comprises a channel, frequency, or program identifier for transmitting the interactive service; and
transmitting, from the network device, a force tune command to the one way device so the one way device tunes to the location, wherein the force tune command is different from the second message.

8. The method of claim 7, wherein allocating resources for the interactive service comprises allocating resources for a switched digital video channel.

9. The method of claim 7, further comprising:
receiving an initialize session message from the gateway device; and
creating, by the network device, a session for the interactive service.

10. The method of claim 9, further comprising:
in response to receiving the second message at the gateway device, transmitting the location to a user communication device associated with the gateway device and the one way device, wherein transmitting the location causes the user communication device to poll the one way device for information comprising the current channel, frequency, or program identifier of the one way device, and determine whether the session has been initialized by comparing the location to the at least one of the current channel, frequency, or program identifier of the one way device.

11. The method of claim 10, further comprising:
in response to being polled, transmitting, from the one way device to the user communication device, data representing the current channel, frequency, or program identifier of the one way device.

12. An apparatus comprising:
one or more processors; and
memory storing executable instructions configured to, when executed by the one or more processors, cause the apparatus, which is located at a network location, to:
receive, from a gateway device that is at a user location, a first message that comprises an indication of whether a one way device at the user location and unable to transmit data to the network location is tuned to an interactive service;
after receiving the first message, transmit, to the gateway device, a second message that comprises information identifying a location of the interactive service; and
receive, from the gateway device, a third message that comprises information specifying a current channel, frequency or program identifier of the one way device.

13. The apparatus of claim 12, wherein the third message comprises a command for the interactive service, wherein the command comprises data representing user input received at a user communication device located at the user location, and wherein the executable instructions are configured to, when executed by the one or more processors, cause the apparatus to:
determine the command from the third message;
process the interactive service according to the command; and
after the processing, transmit the interactive service to the one way device.

14. The apparatus of claim 13, wherein the interactive service comprises a video for display on a display associated with the one way device.

15. The apparatus of claim 13, wherein the location is a channel, frequency or program identifier, and wherein the third message comprises information specifying an address of the one way device.

16. The apparatus of claim 12, wherein the executable instructions are configured to, when executed by the one or more processors, cause the apparatus to:
allocate resources for the interactive service and determine the location of a channel, frequency, or program identifier for transmitting the interactive service; and transmit a force tune command to the one way device so the one way device tunes to the location, wherein the force tune command is different from the second message.

17. The apparatus of claim 16, wherein the executable instructions are configured to, when executed by the one or more processors, cause the apparatus to:
receive an initialize session message from the gateway device
create a session for the interactive service.

18. A method comprising:
receiving, by a network device located at a network location, a pre-allocation message from a two-way device that is at a user location;
allocating, in accordance with the pre-allocation message, resources for a switched digital video (SDV) channel that comprise a timeframe for the SDV channel and at least one of a channel, frequency, or program identifier for the SDV channel;
generating, based on the resources for the SDV channel, a SDV channel resource schedule that comprises at least one of the channel, frequency, or program identifier of the SDV channel;
transmitting the SDV channel resource schedule from the network device to a plurality of devices, which comprises the two-way device and one or more one way devices that are at one or more other user locations different from the user location and are unable to transmit data to the network location; and
receiving a message that comprises information specifying a current channel, frequency or program identifier of a first one way device of the one or more one way devices.

19. The method of claim 18, wherein transmitting the SDV channel resource schedule occurs periodically.

20. The method of claim 18, further comprising:
determining that one or more resources for an allocated SDV channel needs to be changed, and, in response, transmitting a change request message from the network device to one or more two way devices that are part of the plurality of devices;
receiving a response from a first two way device of the one or more two way devices acknowledging the transmitted change request message;
performing a change to the one or more resources of the allocated SDV channel; and
transmitting an updated SDV channel resource schedule from the network device to the plurality of devices, wherein the updated SDV channel resource schedule is in accordance with the change that was performed to the one or more resources of the allocated SDV channel.

21. The method of claim 18, further comprising:
determining that one or more resources for an allocated SDV channel needs to be changed, and, in response, transmitting a first change request message from the network device to one or more two way devices that are part of the plurality of devices;
receiving a first set of one or more responses from the one or more two way devices acknowledging the first change request message;
in response to receiving the first set of one or more responses, determining that a threshold number of responses has not been received by the network device acknowledging the first change request message, and, in response, selecting a substitute allocated SDV channel to be changed instead;
transmitting a second change request message from the network device to the one or more two way devices;
receiving a second set of one or more responses from the one or more two way devices acknowledging the second change request message;
in response to receiving the second set of one or more responses, determining that the threshold number of responses has been received by the network device acknowledging the second change request message and, in response, changing the one or more resources of the substitute SDV channel; and
transmitting an updated SDV channel resource schedule from the network device to the plurality of devices, wherein the updated SDV channel resource schedule is in accordance with the one or more resources of the substitute SDV channel that were changed.

* * * * *